METHOD AND MEANS FOR CONTROLLING A PIPING SYSTEM

Filed Dec. 8, 1960 8 Sheets-Sheet 1

INVENTOR.
PHILIP C. SHERBURNE
BY David D. McKenney
ATTORNEY

INVENTOR.
PHILIP C. SHERBURNE
BY
David D. McKenney
ATTORNEY

INVENTOR.
PHILIP C. SHERBURNE
BY David D. McKenney
ATTORNEY

METHOD AND MEANS FOR CONTROLLING A PIPING SYSTEM

Filed Dec. 8, 1960 8 Sheets-Sheet 4

INVENTOR.

PHILIP C. SHERBURNE

BY David D. McKenney

ATTORNEY

INVENTOR.
PHILIP C. SHERBURNE
BY David E. McHenney
ATTORNEY

METHOD AND MEANS FOR CONTROLLING A PIPING SYSTEM

Filed Dec. 8, 1960 8 Sheets-Sheet 6

INVENTOR.
PHILIP C. SHERBURNE
BY David D. McKenney
ATTORNEY

Dec. 31, 1963 P. C. SHERBURNE 3,115,753

METHOD AND MEANS FOR CONTROLLING A PIPING SYSTEM

Filed Dec. 8, 1960 8 Sheets-Sheet 7

INVENTOR.
PHILIP C. SHERBURNE
BY David D. McKenney
ATTORNEY

Dec. 31, 1963 P. C. SHERBURNE 3,115,753

METHOD AND MEANS FOR CONTROLLING A PIPING SYSTEM

Filed Dec. 8, 1960 8 Sheets-Sheet 8

INVENTOR.
PHILIP C. SHERBURNE
BY David D. McKenney
ATTORNEY 3,115,753
Patented Dec. 31, 1963

3,115,753

METHOD AND MEANS FOR CONTROLLING A PIPING SYSTEM

Philip C. Sherburne, Rumford, R.I., assignor to Grinnell Corporation, Providence, R.I., a corporation of Delaware Filed Dec. 8, 1960, Ser. No. 75,054
18 Claims. (Cl. 60—108)

This invention relates to improvements in methods and means for controlling a piping system which is subject to movements caused by changes in temperature and pressure. More particularly it has to do with a novel method and means for determining the piping stresses which result from such movements by detection of certain changes in the orientation of a substantial portion of the system. These changes in orientation are then employed to regulate external forces which are applied at selected locations on the system and in selected directions and which keep the piping stresses within predetermined limits.

The present invention is particularly useful for controlling the piping systems found in power plants, for example, the main steam line which conducts steam from the superheater header to the turbine in such a plant. Such a pipe line and the equipment to which it is connected must be mounted and supported so that the movements caused by thermal expansion and contraction will not result in unsafe forces being developed anywhere in the system. These movements are caused by changes in the dimensions of the line and equipment as the temperature changes between room temperature (at which the line must be installed) and operating temperature, and if these movements are resisted the resulting distortion develops stresses in the material of the piping and equipment. It is virtually impossible to design and install a practical system in which these movements are not resisted to some extent at some points in the system. The reason for this is that these points are rigidly or semi-rigidly anchored to the building structure or to equipment which is itself moved by changes in temperature in directions other than those which exactly accommodate movement of the pipe line, and even where an attempt is made to provide for free movement of the critical parts of the system considerable friction resistance to this movement is usually encountered and distortion stresses are therefore produced. Obviously the amount of the stress at any particular location will depend upon a number of factors including the configurations and dimensions of the system and of the components therein, the number and location of the anchor points and the friction at those points which are movably secured to such structure.

There are some critical points in a piping system where the maximum allowable thermal expansion forces are quite small. Usually these points are at the terminal connections of the pipe line with the boiler and the turbine. For example, it is not uncommon for the turbine manufacturer to require that the force exerted on each connection of the main steam line with the turbine casing does not exceed 4000 pounds in any direction.

It has been recently proposed to keep the forces at such critical points below the maximum allowable values by the use of external force exerting devices which apply at a point on the piping a force sufficient to pull that point to the location which it would assume solely as a result of the temperature and pressure movement and without any thermal expansion distortion.

It has also been proposed to apply force to a point on the piping system to force at least the portions of the system adjacent the above mentioned critical points to move to what is known as their calculated positions at elevated temperatures. These calculated positions are the positions which the portions are designed to have assuming that distortion of the pipe is uniform and that there is no friction in the auxiliary apparatus associated with the pipe line, such as hangers and roller guides, and that the pipe is weightless, although as a matter of fact because distortion is seldom ever uniform and the auxiliary apparatus seldom has no friction the position of the pipe line differs from that calculated with the result that the stresses in the critical connections may exceed maximum recommended stresses.

Because the piping system is designed so that the stresses on the connections will be safe at these calculated positions and because the above mentioned nonuniformities, etc. cannot be calculated the above mentioned proposal has been to force these pipe portions to assume their calculated positions and thereby prevent them from moving to other positions because of nonuniformities, etc.

I have discovered that one of the indications of forces arising at a critical point due to resisted thermal movement is the orientation of a substantial portion of the system in the neighborhood of that point. For example, the portion of the main steam line adjacent the turbine connections will have its longitudinal axis oriented in space in a certain way with respect to fixed reference objects when the line is installed at room temperature without cold pull. It has been found that when such a line is brought to operating temperature the amount of departure of this axis from an orientation parallel to its installed orientation is a measure of the distortion of the line due to resistance to thermal movement. This change in orientation is to be distinguished from mere change in the dimensions of the portion. For example, the length of the portion will increase with increases in temperature and pressure but this is not an indication of unsafe forces at the critical point. However, if, in addition to increasing in length, the pipe portion bends this is an indication of stress at the critical point and results in a change in the orientation of the portion. Such a change is employed to control forces exerted on the pipe.

This deformation may also be a measure of the amount of departure of the piping from the deformation which exists in the calculated position.

Accordingly it is one object of the present invention to provide improved method and means for controlling stresses in a system of pipe and associated equipment.

Another object is to provide in a pipe system wherein external force is applied to a point thereon method and means for controlling the stresses in the system in accordance with changes in the orientation of a portion thereof.

Antoher object is to provide for a piping system wherein external force is applied to the system method and means for automatically controlling the stresses in said system in response to changes in the orientation of a portion of the system to maintain a predetermined orientation.

Another object is to provide method and means for controlling the stresses in a pipe system by automatically applying to one or more points on the system such forces as are necessary to maintain the axis of a portion of the system parallel to itself in its various positions.

Another object is to provide method and means for sensing deviation in the orientation of at least a segment of a piping system from a predetermined orientation due to a change in temperature to activate a force exerting means to force the pipe segment to assume said predetermined orientation at the changed temperature. The predetermined orientation may be the calculated orientation which the segment is designed to have, in which case it is different from the initial orientation before the temperature change, or it may be the same as the initial orientation which the segment had before the change in temperature in which case the orientation of the segment is maintained substantially constant and the critical points of connection may be rendered substantially stress-free, or it may be any desired orientation.

The sensing means is connected at at least two spaced apart points on the system, preferably two spaced apart points on the segment.

Another object is to provide apparatus for automatically controlling a force exerted on a piping system including a differential pulley for comparing the movement of two points on the system.

In one arrangement for practicing the method and employing means of the present invention these objects are attained by connecting between fixed structure and a point on the piping system a motor-driven force-exerting device which is responsive to the operation of a switch actuated by a differential pulley. A pair of contacts in this switch close when the orientation of a portion of the system departs from a predetermined orientation, indicating development of unsafe forces at a critical location. This completes a circuit which energizes the motor of the force-exerting device causing it to apply on the pipe a force of such an amount and in such a direction that the resulting pipe movement returns the pipe portion to the predetermined orientation and relieves the forces at the critical location.

Figures 1, 2:
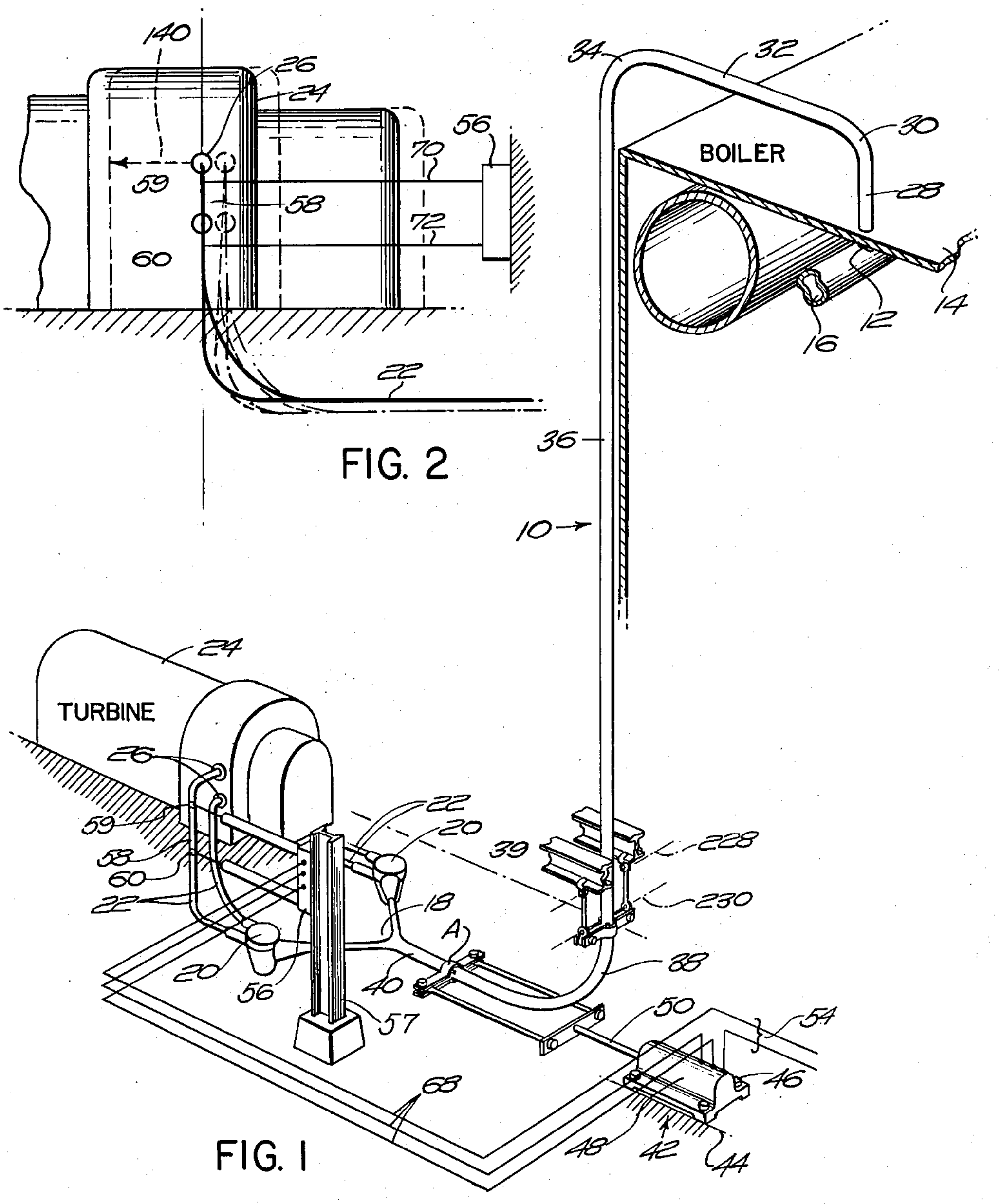
FIG. 1 is a perspective and somewhat diagrammatic view of the method and means of the present invention applied to a power plant main steam line which conducts steam from a boiler to a turbine.
FIG. 2 is a diagrammatic side elevation view of the lower portion of the pipe line of FIG. 1 showing the orientations thereof when the system, which was installed without "cold pull," is at room temperature and at operating temperature.

Referring now more particularly to the drawings, FIG. 1 shows a power plant main steam line 10 with its upper end 12 extending inside the boiler 14 to a superheater header 16 to which it is connected and with its lower end 18 divided into two branches each of which is connected to a stop valve 20. From each such valve two smaller lines 22 lead to the casing of a steam turbine 24 to which they are connected at points 26. Because of the design of modern boilers and the limitations on the choice of location for the steam turbine and generators in a power plant, the main steam line shown in this FIG. 1 is about as short as it can be. Except for the branch at 18 and the smaller lines 22 the line lies in one vertical plane and comprises first a short vertical portion 28 leading from the upper end 12 to a right angle bend 30; next it comprises a horizontal portion 32 leading to the front of the boiler across the top thereof and terminating at right angle bend 34; next a long vertical section 36 leading down the front of the boiler to a right angle bend 38 located somewhat below the center line 39 of the turbine 24; and next a horizontal section 40 leading to the branched end 18.

However, although this line has a minimum length it is nevertheless long enough so that the change from the temperature pressure condition at which the line is installed to the operating temperature-pressure condition is substantial and will result in substantial expansion of the line. This, in turn, causes considerable stress at the connection points 12 and 26 if these are not moved correspondingly to accommodate such expansion. The fact is that these points 12 and 26 do undergo some movement as the temperature-pressure condition changes within the above range. These movements are produced in part by the expansions of the superheater header 16 and turbine 24 with respect to fixed building structure. However, these last mentioned movements do not, of course, exactly accommodate the expansion movements of the line itself and the result is a substantial distortion of the pipe line configuration. At the same time there is some distortion of the turbine casing and of the superheater header caused by the forces exerted on these items by the distorted pipe line. The turbine manufacturer customarily sets a limit on the force exerted at the turbine connections 26. The reason for this is that a greater force may distort the casing enough to cause the turbine blades to rub against it. The boiler manufacturer's force limits are usually more liberal but nevertheless must not be exceeded.

FIG. 1 shows a device 42 for exerting force on the pipe line in accordance with the present invention. This device is shown secured to fixed structure 44 by suitable bolts 46, and comprises a casing 48 from one end of which there extends a reciprocating force transmitting rod 50. A motor in the device 42 is arranged to move the rod 50 back and forth in accordance with a control 56. The motor is preferably an electric motor, receiving its energy from a source (not shown) by electrical leads 54.

The control 56 is mounted on a member 57 provided for that purpose and determines the operation of the motor in the force-exerting unit 42. This motor is reversible so that it will rotate in one direction to move the force-exerting rod 50 to the left (in FIG. 1) and will rotate in the opposite direction to move this rod to the right (in FIG. 1). The control 56 is essentially differential pulley switch actuated by certain movements of the vertical portion 58 of one of the lines 22 leading to a turbine connection 26 from a stop valve 20. More particularly this switch is arranged so that if two spaced apart points 59 and 60 on this vertical portion do not remain in vertical alignment with each other one or the other of switch contacts 62 or 64 (see FIG. 3) will be engaged by the switch armature 66, completing a circuit to the motor. Electrical leads 68 extending from the control 56 are part of this circuit.

FIG. 2 is a somewhat diagrammatic view which shows the lower portion of the pipe lines of FIG. 1, with the pipe in various positions indicated by single lines which would in each case represent its center-line. The solid line shows the orientation of this portion for a system which has been installed without cold pull and which is at room temperature. There is no substantial distortion in the line and no forces are being exerted at the turbine connections 26. The differential pulley switch is represented in this view by the box 56 which would constitute a casing for the switch components. Flexible cables 70 and 72 lead from points 59 and 60, respectively, on the selected vertical pipe portion 58 to the switch. FIG. 2 also shows in dotted lines the position of the pipe line 22 when the system is at operating temperature and the method and apparatus of the present invention are not being employed, and the dot-dash line in this figure shows the position of this line when the system is at operating temperature and the method and apparatus of the present invention are being employed.

For a pipe line like that of FIG. 1 it has been determined that if the longitudinal axis of the portion 58 is straight and vertical when there is no substantial force imposed on the turbine connections 26 (see the solid line in FIG. 2) then if this axis is maintained in such orientation by application of suitable force on the pipe line, the force exerted at the turbine connections 26 will remain substantially zero.

Figure 3:
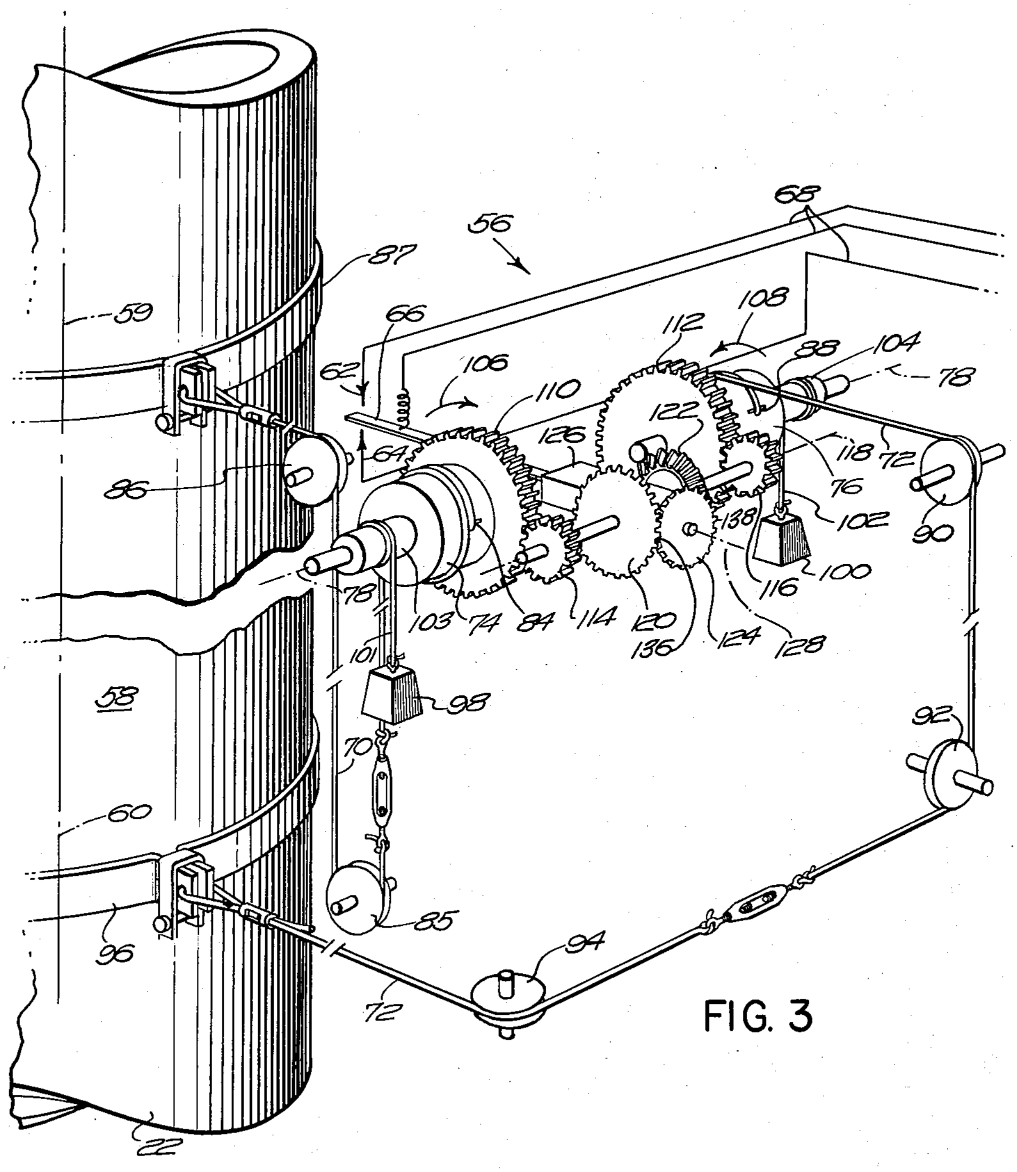
FIG. 3 is a diagrammatic perspective view of a differential pulley switch actuated by changes in the orientation of the selected pipe line portion from a predetermined orientation.
Figure 4:
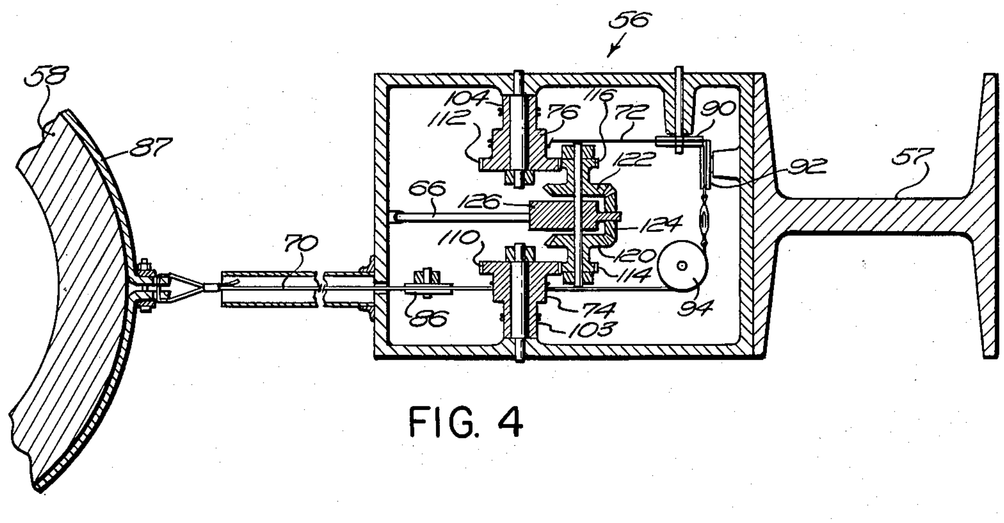
FIG. 4 is a somewhat diagrammatic cross sectioned plan view of a switch like that of FIG. 3 and taken on line 4—4 of FIG. 5.

Referring now to FIG. 3, this shows in perspective and somewhat diagrammatically the details of a differential pulley switch which may be used in the present invention to detect changes of a certain amount in the orientation of the pipe portion 58 between points 59 and 60. The change which is detected may be described as a change of the angular relationship between the axis of the portion 58 and turbine 24. This change is thus a change in rotational orientation of the portion with respect to the turbine. More particularly, this switch comprises a pair of pulleys 74 and 76 which have a common axis 78 and which are provided with the cables 70 and 72, respectively. Cable 70 has one end wrapped around pulley 74 a turn or two and then secured to that pulley at point 84. From this pulley cable 70 extends vertically downward to a direction-changing pulley 85, then vertically upward to a direction-changing pulley 86 and then horizontally to a pipe strap 87 encircling the pipe line portion at point 59. The other end of this cable is secured to this strap in the manner shown. The pulleys 85 and 86 are employed so that the total length of the cables 70 and 72 will be substantially the same and the effects of temperature will be the same on their lengths. The cable 72 has one end similarly wrapped a turn or two around the pulley 76 and secured thereto at point 88. From this pulley cable 72 extends horizontally to a direction-changing pulley 90, thence vertically downwardly to a second direction-changing pulley 92, thence horizontally in the plane at right angles to the vertical plane of the cable 70 to a direction-changing pulley 94, and thence horizontally in the plane of the cable 70 to a pipe strap 96 to which it is secured in the manner shown and which encircles the selected pipe portion 58 at point 60.

The pulleys 74 and 76 are of the same size and are both biased in a direction to keep their respective cables 70 and 72 taut by weights 98 and 100 which are suspended by additional cables 101 and 102 from smaller diameter pulleys 103 and 104, respectively. More particularly these cables are wrapped around the pulleys one or more times and secured to them. Pulleys 74 and 103 are fastened together to rotate in unison independently of pulleys 76 and 104, which are similarly fastened together. Pulleys 74 and 76 are spaced apart along their common axis.

Figure 5:
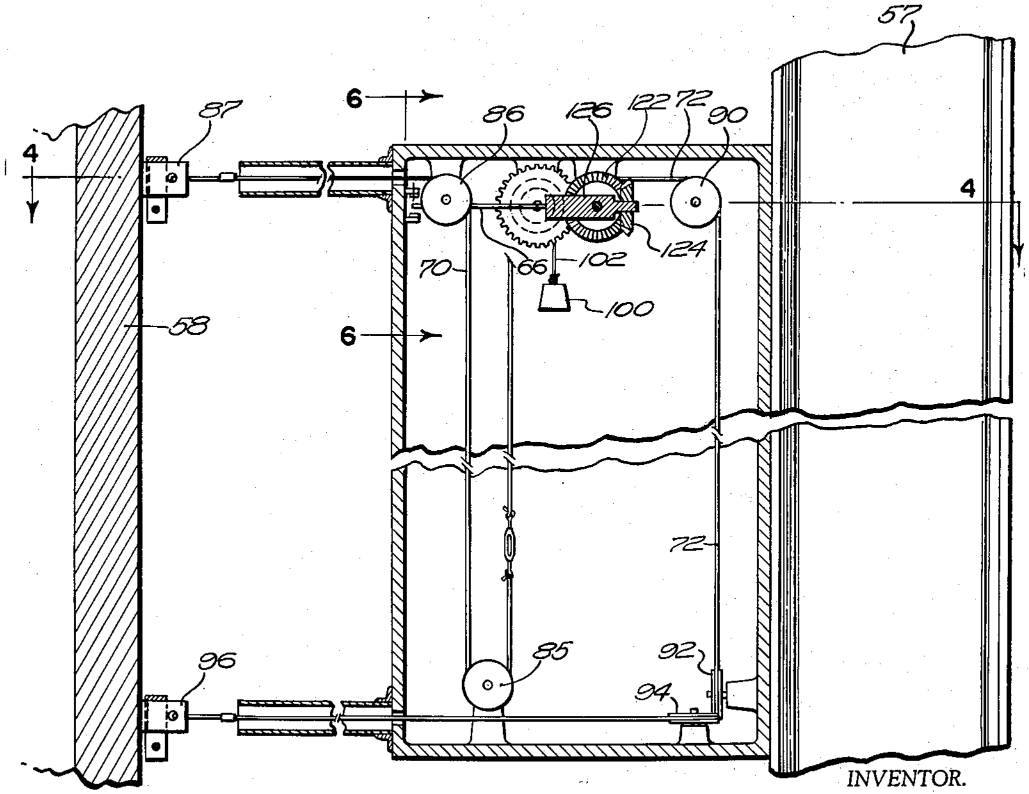
FIG. 5 is a somewhat diagrammatic sectioned side elevation view of the switch shown in FIG. 4.

It will be seen from the description thus far that if the upper point 59 moves toward the right (FIG. 5) in the vertical plane containing the cable 70 the pulley 74 will rotate in a clockwise direction under the influence of bias weight 98. This direction is indicated by the arrow 106. Similarly it will be seen that if the point 60 on the pipe line moves to the right (FIG. 5) in the same plane the pulley 76 will rotate in a counter clockwise direction which is indicated in this figure by the arrow 108. Since the pulleys 74 and 76 and the cables 70 and 72 are the same size movement of the points 59 and 60 horizontally to the right in the same vertical plane by the same amount causes the clockwise rotation of the pulley 74 to be just equal to the counter clockwise rotation of the pulley 76.

Secured to the pulleys 74 and 76, respectively, so as to rotate therewith are gears 110 and 112 which are the same size and which mesh with much smaller gears 114 and 116, respectively. These latter gears are also the same size and have a common axis 118 parallel to the common axis 78 but they rotate independently of each other. Secured to each of the smaller gears 114 so as to rotate in unison therewith is a beveled differential gear 120 (122). A beveled idler gear 124 is mounted on a block 126 for rotation about an axis 128. This block is, in turn, rotatably mounted (independently of gears 120 and 122) on the common axis 118, and the idler gear is meshed with both the gears 120 and 122 in the usual fashion of a differential. Extending from the end of the block 126 which is opposite to the idler gear 124 is the switch armature 66 the end of which extends between the pair of contacts 62 and 64 and normally out of engagement with them.

The operation of the above-described differential pulley switch is as follows: If the points 59 and 60 move horizontally, by the same amount in the same vertical plane and in the same direction the rotation of one of the pulleys 74 and 76 in one direction will be just equal to the opposite rotation of the other pulley. Consequently the corresponding rotations of the differential beveled gears 120 and 122 will be equal because they are of the same size, the small gears 114 and 116 are of the same size and the large gears 110 and 112 are of the same size. As a result the axis 128 of the idler gear will remain in the position shown (which is substantially horizontal) and the armature 66 will not engage either of the contacts 62 or 64.

More particularly the reason why the axis of the idler gear 124 does not move is that the side of the idler gear engaging the gear 120 at point 136 thereon is moved in one direction (up or down) at the same rate as the point 138 on the other side is moved in the opposite direction. On the other hand if one of the gears 120 or 122 moves its point 136 or 138 faster than the other (because of the points 59 and 60 on the pipe not remaining in vertical alignment) the axis 128 of the idler gear 124 will rotate about the axis 118. This in turn will cause the armature 66 to engage either the contact 62 or the contact 64.

It has been determined in the pipe line arrangement of FIG. 1 that the principal force produced at the turbine connections 26 by the expansion of the piping at the operating temperature-pressure condition is a force on the turbine casing in the direction of the dotted arrow 140 shown in FIG. 2, and it has been further determined that this force will be minimized by pulling on the pipe at point A (see FIG. 1) with the force-exerting device 42 until the vertical pipe line portion 58 is vertical as shown by the dot-dash line in FIG. 2. Forces developed on the turbine casing in directions other than that of the arrow 140 are believed to be sufficiently small in the arrangement of FIG. 1 to be ignored.

Accordingly, referring once more to FIG. 3 it is expected in the arrangement of FIG. 1 that the expansion of the line would cause the point 60 to move to the left from its initial position under the point 59. This in turn would result in armature 128 engaging the lower contact 64 and completing a circuit which energizes the motor in the force-exerting device 42 to pull the point A on the piping to the right in FIG. 1. This operation of the motor would continue until the point 60 was again vertically below the point 59, the condition which will result in minimum stress at the turbine connecton 26. Then the armature 66 would move out of engagement with contact 64, and the operation of the motor in the force-exerting unit 42 would cease. Although it is not likely to be needed in the arrangement of FIG. 1, provision can be made for correcting movements of point 60 to the right from its initial position under point 59. In such a case armature 66 would engage the upper switch contact 62 and energize the motor in device 42 to move point A to the left in FIG. 1. Thus, the device 42 could be arranged to push the point A until point 60 again came vertically under point 59. As shown in FIG. 1 the device 42 is arranged to pull only.

Figures 6, 7, 8:
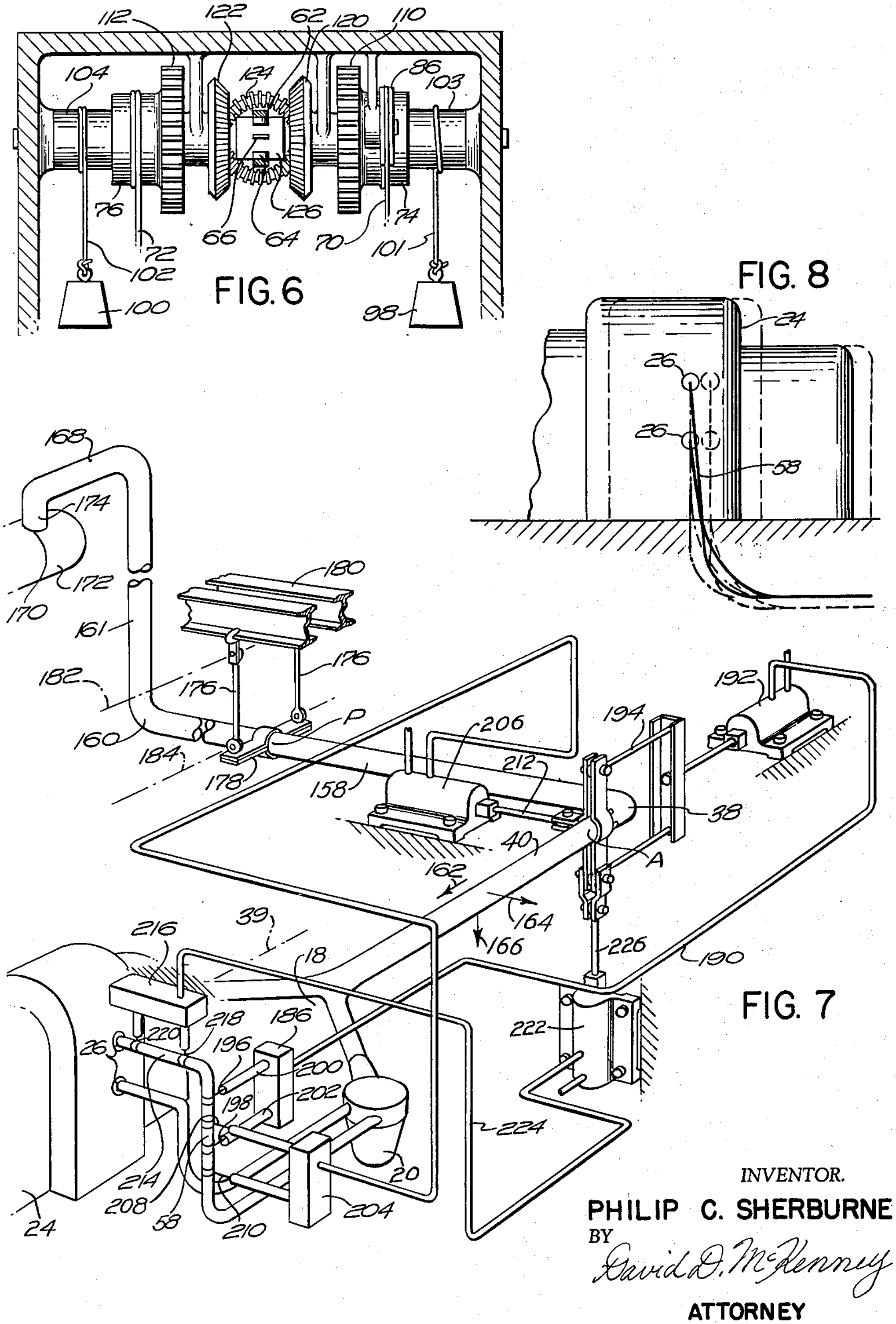
FIG. 6 is a cross sectioned end elevation view taken on line 6—6 of FIG. 5.
FIG. 7 is a diagrammatic perspective view of a different pipe line showing the portion adjacent the turbine and showing how apparatus of the present invention may be employed in different planes to completely control the orientation of the line.
FIG. 8 is a view like FIG. 2 but showing the different orientations of a portion of the system when the system is installed with "cold pull;"

Referring now to FIG. 7 this shows in perspective and somewhat diagrammatically how the method and means of this invention may be employed to detect and control pipe orientation in several planes simultaneously. Thus, for example, in the arrangement of FIG. 1 it is believed that thermal movement of the pipe line would cause the vertical pipe portion 58 to remain substantially in a vertical plane parallel to the axis of the turbine. In the arrangement of FIG. 7 the pipe line is so disposed that thermal growth would cause the corresponding portion 58 to move appreciably out of the vertical plane parallel to the turbine axis. This in turn would produce significant forces in several directions on the turbine casing at the piping connections 26. In FIG. 7 each of the movements of the vertical portion 58 have been considered as separated into two components, that which is in a vertical plane parallel to the turbine axis 39 and that which is in a vertical plane perpendicular to the turbine axis. The movements of the horizontal portion 214 out of the horizontal plane have also been considered.

The turbine is again represented by numeral 24, the turbine connection by the numeral 26, the stop valve by numeral 20, and the branched pipe by the numerals 18, 38 and 40. Instead of extending up the front of the boiler from the right angle bend 38, the pipe has another horizontal portion 158 which terminates in another right angle bend 160 which then turns the pipe upwardly (section 161) to the top of the boiler. The result of this more complex configuration is that when the pipe is heated up to operating temperature the portion 40 is moved by thermal expansion in the directions indicated by the arrows 162, 164 and 166.

Movement in the direction of arrow 162 corresponds to the movement of the similar section 40 in FIG. 1 and takes place because the growth of section 40 is greater than the growth of the parallel horizontal section 168 leading from section 161 to the connection 170 of the pipe line with the superheater header 172. A short vertical section 174 actually joins the section 168 with this connection.

Movement in the direction of arrow 164 takes place because of the increase in the length of horizontal section 158.

Movement in the direction of arrow 166 takes place because of the increase in length of vertical section 161 which greatly exceeds the increase in length of vertical section 174. This latter movement is up at section 40 because the horizontal section 158 is pivoted at a point P by rigid hangers 176 connected at their lower ends to a clamp 178 engaging the pipe at point P. The upper and lower ends of each of the rigid hangers are pivotally connected by universal joints to fixed building structure 180 and to the clamp 178.

By this arrangement downward movement of the lower end of the vertical section 161 from the position shown due to thermal growth of section 161 tends to pivot section 158 about axis 184 and raise section 40. At the same time, however, the pivotal connections of the hangers 176 permit axial movement of sections 158 and 40.

Thus instead of a pipe arrangement in which there is significant movement in only one direction, FIG. 7 shows an arrangement in which there are significant movements in three directions and hence significant forces imposed in these three directions on the turbine connections. As in the case of FIG. 1 these forces are detected in FIG. 7 by the amount of change in orientation of one of the smaller lines 22 from its initial orientation. This time, however, the changes are measured in three planes at right angles to each other.

For example, there is a differential switch 186 corresponding to the switch 56 in the earlier figures and arranged to detect those changes in the orientation of section 58 which take place in a vertical plane parallel to the turbine axis 39. This switch 186 through electrical conduit 190 controls the operation of a force-exerting unit 192 which is connected at point A on the horizontal portion 40 by a suitable harness 194. The force-exerting unit 192 is arranged to move the section 58 in the same vertical plane in which changes in orientation are detected by switch 186 and is further arranged to exert force in the direction which will correct these changes. Cables 196 and 198 and their protective shields 200 and 202, respectively, transmit changes in the orientation of the section 58 to the switch 186.

To accommodate changes in orientation of section 58 which take place in a vertical plane perpendicular to the turbine axis a switch 204 and force-exerting unit 206 are provided. Switch 204 is connected by suitable cables 208 and 210 to the section 58 and unit 206 is arranged to exert a force on the point A through a rod 212 to restore the original orientation of this section 58 with respect to movements in a vertical plane perpendicular to the turbine axis 39.

It would be possible for the section 58 to remain vertical and still have substantial forces exerted on the turbine connections 26 if the section 214 of the small line became non-horizontal. To detect such changes a switch 216 is provided with cables 218 and 220. This switch controls a force-exerting unit 222 through electrical conduit 224. Unit 222 applies its force to the pipe at point A through a rod 226.

The operation of this equipment is clear from the description of the operation in the earlier figures. As in the case of the arrangement of FIG. 1 this operation is based on the discovery that the stresses at turbine connections 26 are kept at a minimum when the original orientation of the adjacent portions of the line as installed (assuming no cold pull) is unchanged. In FIG. 7 it is possible that the operation of any one of the three force-exerting units 192, 206 or 222 could contribute to a change in the type of orientation which is detected by one of the switches for the other two. This possibility is one reason for employing three such units. Errors in orientation resulting from an attempt to correct one error are themselves corrected.

FIG. 8 is a side elevation view (like FIG. 2) of the connections of the pipe line to the turbine, but showing the positions of this portion of the line at the installation temperature and room temperature when the line is insalled with "cold pull." The pipe in each of the various positions is indicated by a single line. This line is solid for the installed (room) temperature without the use of the present invention, dot-dash for the installed (room) temperature with the use of the present invention, and dotted for the operating temperature. The dotted position is the position which the pipe would assume with or without the present invention because the cold pulling technique involves cutting the pipe sections to such length that the line must be distorted during its installation at room temperature, but this distortion is of such an amount that it disappears when the line is heated to operating temperature.

Thus in the arrangement of FIG. 8 the force-exerting unit (not shown) would be arranged to exert on the pipe at room temperature a force which would maintain the portion shown in FIG. 8 in the dot-dash position. Similarly, as the pipe is heated up to operating temperature this force-exerting unit would continue to exert such force as would be necessary to maintain the portion 58 in a vertical position. This would require less and less force as the temperature increased until, at operating temperature, no force would be required.

The above described "cold pull" is what might be called 100% cold pull because the line is fabricated so as to be completely undistorted at the operating temperature. There are modifications of this cold pulling technique which involve fabricating the line so that there is some distortion at room temperature and some opposite distortion at operating temperature with the line having distortion free condition at some intermediate temperature.

Referring again to FIG. 1, although vertical movement of the pipe line can be substantial because of the great length of the section 36, the effect on the turbine connections of most of this movement can be eliminated by the proper use of pivoted rigid hangers 227. These hangers are pivotally secured to the pipe at about the level of the turbine axis 39 (which is also approximately the level of the connections 26) for rotation about an axis 230 perpendicular to the turbine axis and are similarly pivotally secured to building structure 232 for rotation about an axis 228 parallel to axis 230. The result is that the forces exerted on the turbine connections 26 are caused almost entirely by the changes in the dimensions of the horizontal portions 40 and 32 and of the horizontal parts of the smaller lines 22, and substantially no force is exerted on the connections as a result of changes in the dimension of vertical portion 36. The reason for this is that the great majority of the change in length of portion 36 takes place above the rigid hangers 227, and the small part which takes place below these hangers is substantially balanced by the corresponding change in the length of the vertical portions of smaller lines 22.

Figure 9:
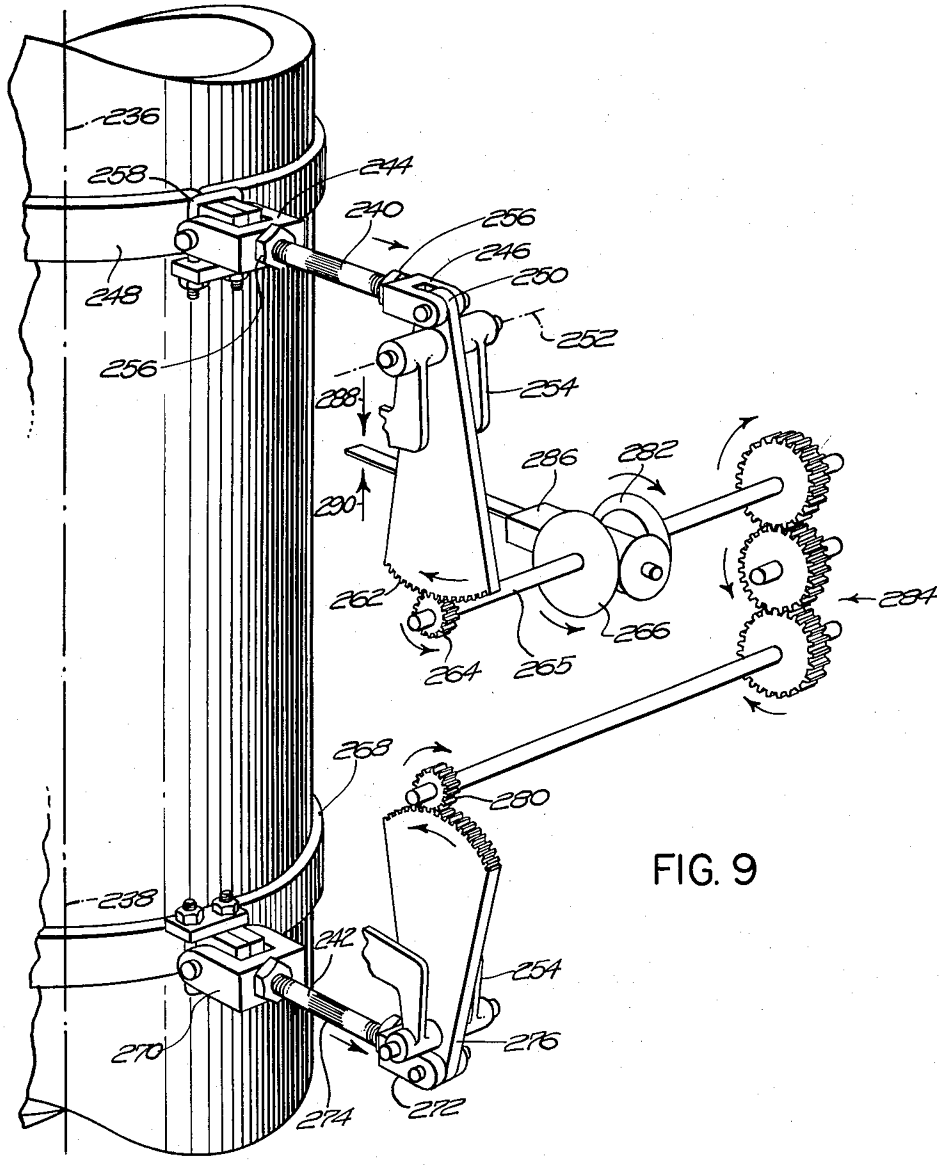
FIG. 9 is a view like FIG. 3 but showing another type of differential switch.

FIG. 9 of the drawings shows a switch of the differential type but which is connected to spaced apart points 236 and 238 on the section of the pipe line leading to the turbine by rigid rods 240 and 242 rather than by cables as in FIG. 1. More particularly the rod 240 has its ends in adjustable threaded engagement with clevises 244 and 246, pivotally secured to a pipe clamp 248 and to a segment gear 250, respectively. The pivotal connection of the clevis 246 with the segment gear is at a point spaced from the axis 252 of the pivotal mounting of this gear on a frame 254. Lock nuts 256 on the rod 240 serve to fix it with respect to the clevises after the proper adjustment has been made. The pipe clamp 248 is secured to the pipe section at the level of the point 236 thereon. A device 258 serves to tighten the clamp 248 securely against the pipe.

The pivotal connection of the clevis 246 with the segment gear 250 is much closer to the axis 252 than the radius of the gear portion itself. Accordingly, small movements of the point 236 substantially along the axis of the rod 240 produce substantial movements of the tooth portion 262 of the segment gear. This tooth portion is meshed with a small gear 264 secured on the same shaft 265 with one of the beveled gears 266 of a differential type switch. As a result movement of the point 236 to the right in FIG. 9 produces a counter clockwise rotation of the beveled gear 266.

The point 238 on the pipe is similarly provided with a clamp 268, clevises 270 and 272, rod 274 and segment gear 276 like those above described. The segment gear 276 is also meshed with a smaller gear 280 similar to the gear 264, but instead of being on the same shaft as the other beveled differential gear 282 this gear 280 forms part of a gear train 284 which drives gear 282. This gear train is so arranged that movement of the point 238 to the right produces a clockwise rotation of the beveled gear 282. By the use of identical corresponding parts associated with the two points on the pipe equal movements of these points in the plane defined by the rods 240 and 242 produce equal and opposite rotations of the beveled differential gear 266 and 282. As in the case of the differential pulley switch of FIG. 3, the differential armature 286 remains stationary and out of engagement with contacts 288 and 290 when these beveled gears thus rotate in opposite directions and by the same amount. If, however, one of the points 236 and 238 moves faster than the other or more than the other in this plane the differential switch armature 286 will engage one of the contacts to operate a force exerting unit (not shown) to restore the original orientation of the two points with respect to each other.

Figure 10:
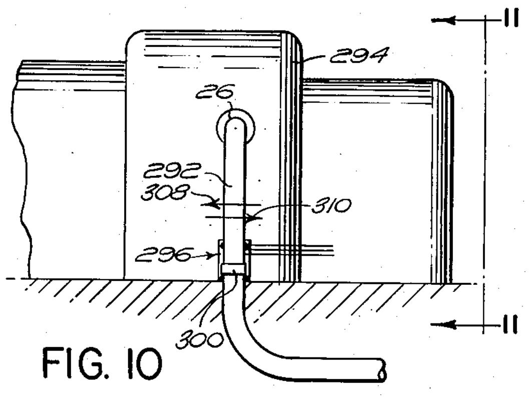
FIG. 10 is a diagrammatic side elevation view of another embodiment of the invention.
Figure 10A:
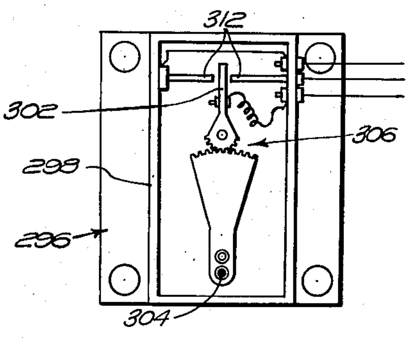
FIG. 10A is a diagrammatic sectioned side elevation view of the switch used in the embodiment of FIG. 10.
Figures 11, 12, 13, 13A, 14:
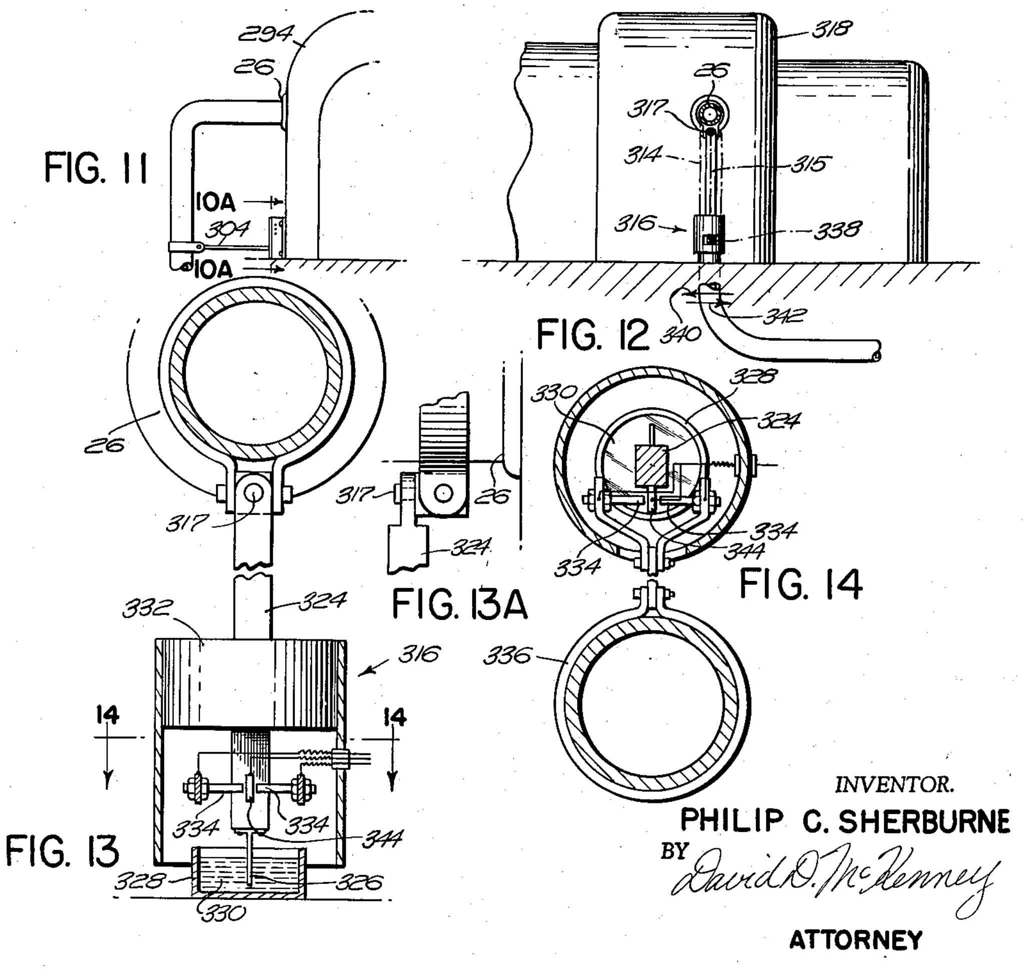
FIG. 11 is a diagrammatic end elevation view of the embodiment of FIG. 10.
FIG. 12 is a diagrammatic side elevation view of still another embodiment of the invention.
FIG. 13 is an enlarged sectioned view of the embodiment of FIG. 12.
FIG. 13A is a fragmentary end elevation view of a detail of the embodiment of FIG. 13.
FIG. 14 is a diagrammatic top plan elevation view of the embodiment of FIG. 13.

FIGS. 10 and 12 show additional modifications of the invention. In FIG. 10 the reference orientation for the pipe portion 292 is the turbine casing 294 itself on which the switch 296 is mounted. With such an arrangement a differential-type switch is not necessary because movements of the turbine connection 26 are compensated for by corresponding movements of the switch housing 298. Accordingly, it is merely necessary to detect movements of the point 300 on the pipe portion remote from the connection 26 with respect to the switch housing. Such detection is achieved by merely connecting point 300 to a switch armature 302, for example by a rod 304 and gear arrangement 306 (see FIG. 10A). When movement of the point 300 exceeds a predetermined amount in either of the two principal directions (indicated by arrows 308 and 310) armature 302 engages one of the contacts 312. This completes a circuit to the motor in the manner previously described.

In FIG. 12 the reference orientation for the pipe portion 314 is a plumb line 315 along which the switch 316 is maintained. With such an arrangement a differential-type switch is again not necessary because the upper end of the switch is pivotally fixed at 317 with reference to the turbine casing 318. In addition, however, this arrangement makes it unnecessary to assume that the portion of the turbine casing to which the switch is pivotally connected (as in FIG. 10) retains its orientation. More particularly the switch is pivotally suspended from the point 317 near the turbine connection 26 and contains a pendulum armature 324 having a paddle portion 326 extending into a container 328 of liquid 330. This arrangement dampens the effect of any vibratory movements of the armature. The switch armature 324 is provided with a pendulum weight 332. The contacts 334 for the armature are carried by a clamp 336 located at a point 338 which is on the pipe portion 314 and which is spaced from the turbine connections 26.

As the pipe portion 314 moves in one of the two principal directions (indicated by arrows 340 and 342) a contact 344 carried on the armature 324 engages one of the contacts 334 which are substantially stationary because the switch 316 remains on the plumb line 315 under the influence of gravity. This engagement of the contacts completes a circuit to the motor of a force exerting unit in the manner previously described.

In the foregoing description it has been assumed that the stress-free condition at the critical points is achieved when the orientation of an adjacent section is kept constant over the temperature range.

It will be understood, however, that the stress-free condition may obtain when the orientation at each temperature is slightly different by a known amount than at room temperature and slightly different by a known amount at the other temperatures within the range.

Similarly, the present invention contemplates maintaining the pipe section adjacent the critical point at its calculated orientation for each temperature within the range of temperatures, which orientation varies by a known amount as the temperature increases.

Figure 15:
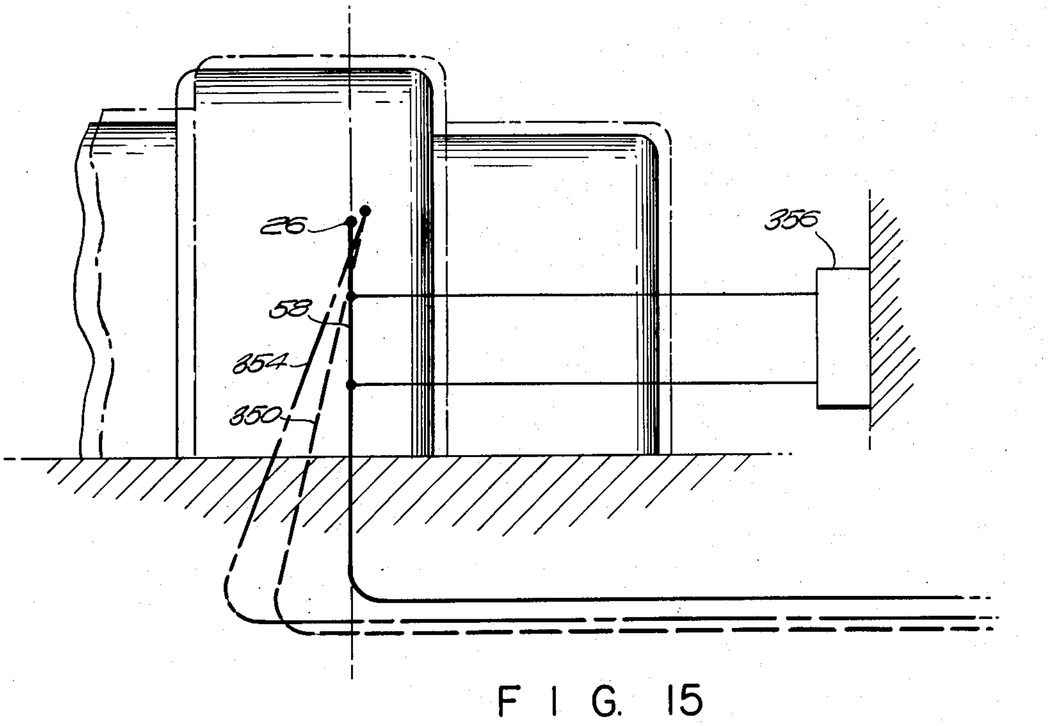
FIG. 15 is a view like that of FIG. 2 but illustrating maintenance of the pipe line in its calculated position.

In either case it becomes necessary to change the orientation over the temperature range in a predetermined manner and this is done in accordance with the embodiment shown in FIG. 15 by controlling the force exerting units by the differential switch to force the orientation to change in the predetermined manner by sensing deviations from predetermined orientation at each temperature and signalling the force exerting units to move the pipe to force it to the predetermined orientation. This is achieved by employing a differential switch in which the pulleys or corresponding members are different from each other. It is merely necessary to know the relative amounts of movement of the two points 59 and 60 which results from the desired orientation and to arrange the differential pulley members accordingly.

Figure 16:
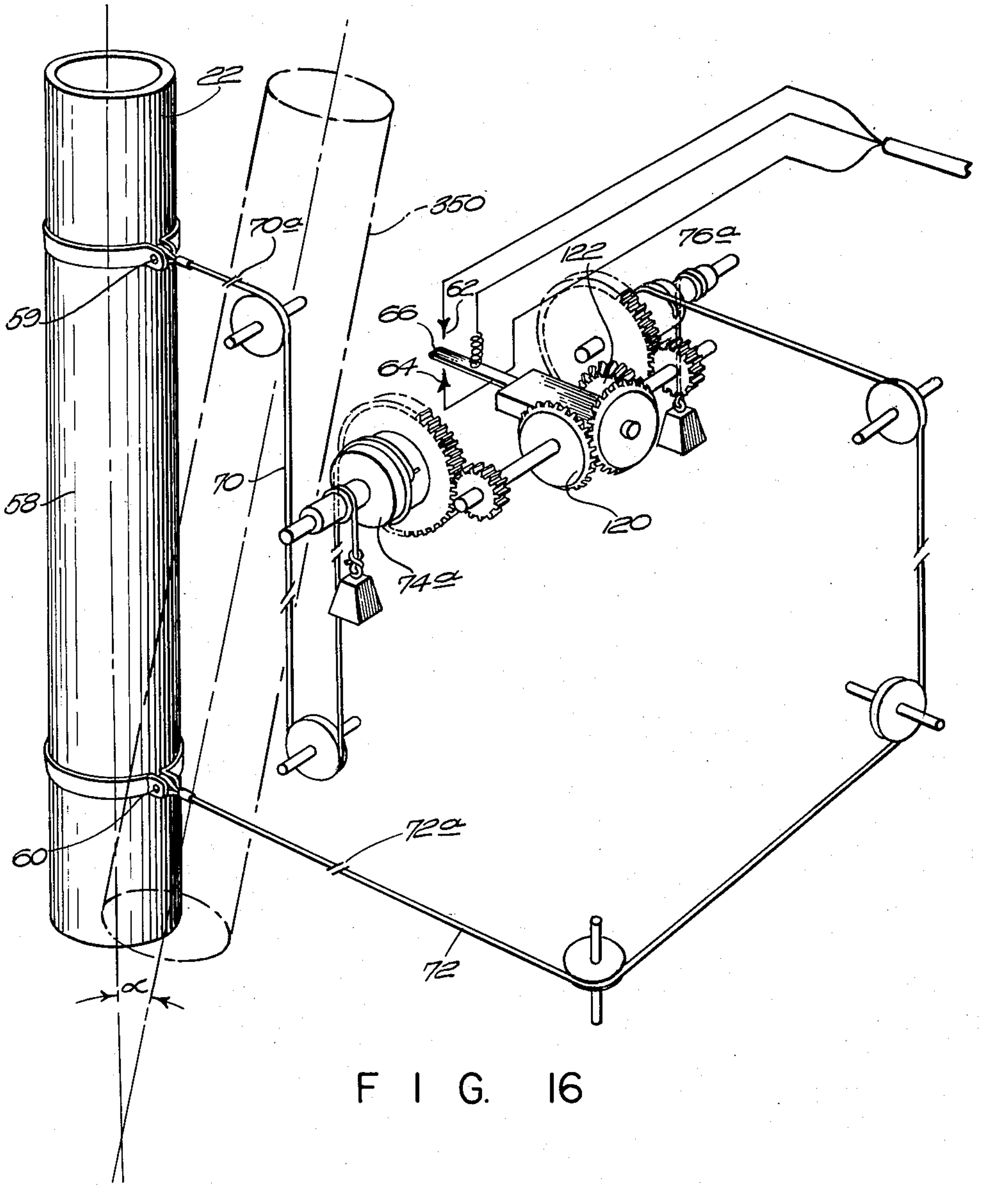
FIG. 16 is a view like FIG. 3 but showing a modified differential pulley switch for FIG. 15.

This is illustrated in FIG. 15 which is like FIG. 2 and comprises the same part of FIG. 1 except that the dotted line 350 represents the calculated orientation of the pipe at operating temperature, the dot-dash line 354 represents the orientation which the pipe might have at operating temperature as a result of uncalculatable non-uniformities in expansion and contraction and as a result of uncalculatable effect of friction in the accessory equipment such as hangers, and the differential switch 356 is different from the corresponding switch 56 in FIG. 2 as shown in FIG. 16.

FIG. 16 shows in solid lines the room temperature orientation of the pipe section 58 to which the differential pulley is secured at points 59 and 60. The calculated orientation of this pipe section at the operating temperature is shown in dotted lines. Because these orientations differ the amount of movements of points 59 and 60 differ and this will be true for each temperature increase between room temperature and operating temperature. For the purpose of this illustration it is assumed that the change in angle $\alpha$ is linear over the temperature range. For example, for any 50 degree increase in temperature in the temperature range the change in angle $\alpha$ is the same as for any other 50 degree increase. As a result of this determination of the calculated orientation for each temperature it follows that there is a substantially fixed ratio between the amount of movement of point 59 and point 60 for any temperature change; and accordingly, in order to control the force exerting unit it is only necessary to provide pulleys 74*a* and 76*a* having different diameters in the same ratio. More particularly, pulley 74*a* will be larger in diameter than pulley 76*a* by the ratio of movement of point 59 to movement of point 60, which is known. Thus, if because of non-uniformity in pipe deformation or any other reason the points 59 and 60 do not move in accordance with this ratio the differential switch armature 66 will after a slight temperature rise engage that contact 62 or 64 which will actuate the force exerting unit in a direction to force the pipe to its calculated orientation for that temperature rise, whereupon the armature disengages from the contact and the force exerting unit will be deactuated.

The force exerting unit is designed so that when actuated it will move the pipe and through it the armature 66 at a rate substantially faster than the greatest rate of movement of the armature 66 caused by temperature changes.

It will be understood that the cables 70 and 72 and the pulleys therefor will in practice be so located and arranged that the differential switch will not interfere with the movement of the pipe section 58 to the calculated orientation in FIG. 16. This is indicated by the breaks 70*a* and 72*a* shown in these cables.

Except to the extent that new numbers are used as above the other parts in FIGS. 15 and 16 have the same numbers as their corresponding parts in FIGS. 1, 2, and 3.

Although the above description has had to do mostly with controlling the location of a piping system or a portion thereof, it will be understood that the invention is also applicable to controlling the location of fluid handling equipment other than piping, as for example, boiler components such as the steam header and cyclones conventionally used with boilers. In the case of cyclones, there are changes in weight during operation which may cause the orientation of the cyclone center axis to depart from its desired location because of accumulations of material in it. These changes in orientation are sensed in accordance with this invention and the sensor controls a force applying mechanism which applies a force to the cyclone which maintains it in the proper position.

It is pointed out that in each of the above embodiments the control for the force applying unit is connected to two spaced apart points along the fluid handling system which includes the turbine and boiler. In FIGS. 1 to 6 these points are 59 and 60. In FIGS. 7 to 9 the points are those corresponding to 59 and 60 in FIG. 1. In FIGS. 10, 10A and 11 one point is the point 300 on the pipe and the point of attachment of the switch unit 296 to the turbine. In FIGS. 12 to 14 one point is the point 317 on the turbine to which armature 324 is attached and the other point is the point 338 on pipe portion 314 to which the switch unit is attached.

Although in the above embodiments movement of a portion of the pipe is controlled to maintain the orientation of that portion in a particular relation with respect to a reference independent of the orientation of other portions of the fluid handling system (FIGS. 1 to 9 and 12 to 14) or dependent on the orientation of a portion of fluid handling equipment such as the turbine casing which is assumed to remain unchanged (FIGS. 10 and 11), it is within the scope of this invention to control the orientation of a portion with respect to the orientation of another portion which is changed by the temperature increase alone or by that increase and by any force applied in the control of the orientation. For example, the differential switch could have its casing mounted on one portion of the piping and have its cables connected to two points on another portion of the piping.

Actuation of the force applying mechanisms is independent of a change in length of such mechanisms caused by force applied to the mechanisms external of them.

The term "energy valve means" (controlled coupling between the source of energy and the force applying unit), as used in the claims hereof, includes an electric switch or switches such as those numbered 62, 64, 66 (FIG. 3), 302—312 (FIG. 10A), 334—344 (FIG. 13) in the drawings and located between the motor which drives the force applying unit and the source of electrical energy. It also includes any other kind of controlled coupling by which a supply of energy to the force applying unit is regulated or modulated.

The terms "position" and "location" as used herein with respect to the piping or any other portion of the fluid handling equipment are used interchangeably.

This application is a continuation-in-part of my application Serial No. 725,043, filed March 31, 1958, now abandoned.

I claim:

1. A device for controlling the orientation of a pipe segment with respect to a piece of fluid handling equipment in a fluid system, said device including a differential electric switch having an armature connected to two spaced-apart points on a pipe segment and having switch contacts adapted to be engaged by said armature, said armature being moved one way by movement of one of the points on the pipe segment in one direction and being moved the opposite way by movement of the other of the points on the segment in the same direction, whereby the armature is substantially stationary when both points on the pipe segment move in the same direction in a predetermined manner and whereby said armature moves when the points on the pipe segment move in different directions and also when they move in the same direction in a manner different than said predetermined manner, a force exerting unit acting on the pipe segment and electrically connected to said switch and being actuated by engagement of said armature with one of said contacts to thereby exert a force on the pipe segment to maintain it in any desired orientation with respect to the equipment.

2. A device for controlling the orientation of a pipe segment with respect to a piece of fluid handling equipment in a fluid system, said device including a differential electric switch having an armature pivoted on an axis and provided with a bevelled pinion, a pair of bevelled gears rotatable about said axis and meshed with said pinion at opposite points thereon, one of said gears being connected to a first point on the pipe segment and being rotated one way a certain amount by movement of the first point in one direction by a certain amount, the other of said gears being connected to a second point on the pipe segment and being rotated the other way an equal amount by a certain amount of movement of the second point on the pipe segment in the same direction, whereby said armature remains substantially stationary when both the first and second points on the pipe segment move in the same direction by said certain amounts, and whereby said armature rotates about said axis when the first and second points on the pipe segment move in different directions and also when the points on the pipe segment move in the same direction by amounts other than said certain amounts, a contact engaged by said armature to close said switch when said armature rotates a predetermined amount, a force exerting unit acting upon the pipe segment, said force exerting unit being electrically connected to said switch and being actuated by engagement of said armature with said contact to exert force on the pipe segment to maintain it in any desired orientation with respect to the equipment.

3. A piping system which extends between and has its opposite ends secured to connections on fluid source equipment and fluid receiver equipment, which is subject to changes in its length with changes in temperature through a temperature range and which includes a pipe segment having its axis oriented in a predetermined manner with respect to one of said equipments at one temperature within said range and having said predetermined axis orientation changed by said changes in length, means connected to spaced-apart points on said pipe segment for measuring changes in said segment axis orientation from said predetermined orientation, means connected to a point on said system for exerting force on and moving said system at said point with respect to said one of said equipments to change said segment axis orientation, and means connecting said measuring means to said force exerting means for actuating said force exerting means in accordance with said changes in said segment axis orientation to reduce any changes in said segment axis orientation from said predetermined orientation.

4. Apparatus for maintaining a segment of a piping system at a desired orientation with respect to a piece of fluid handling equipment to which said system is connected during changes in the temperature of said system, said apparatus comprising a mounting member having an orientation with respect to said equipment which remains substantially constant during said temperature changes, means connected to two spaced-apart points on said segment and to said mounting member for measuring the amount of a first change of orientation of said segment with respect to said equipment due to said system temperature changes, means connected to a part of said system for exerting force on and moving said part with respect to said equipment, said movement of said part producing second changes in said segment orientation, and means connecting said measuring means to said force exerting means for actuating said force exerting means in accordance with said first changes in said segment orientation to move said piping system part to reduce said first changes in said segment orientation.

5. Apparatus for maintaining a pipe segment at any desired orientation with respect to a piece of fluid handling equipment in a fluid system, said apparatus comprising a force exerting unit connected to a part of said system, a conduit conducting energy to said force exerting unit from an energy source, a control mechanism having a member connected to two spaced-apart points on said pipe segment and having energy valves in said conduit which are connected to said member and which are actuated by movement thereof, said member being moved one way by movement of one of said points on the pipe segment in one direction and being moved the opposite way by movement of the other of the points on the segment in the same direction, whereby the member is substantially stationary when both points on the pipe segment move in the same direction by the same amount and whereby said member moves when the points on the pipe segment move in different directions and also when they move in the same direction by different amounts.

6. A device for maintaining a pipe segment at any desired orientation with respect to a piece of fluid handling equipment in a fluid system, said device including a differential electric switch having an armature connected to two spaced-apart points on a pipe segment and having switch contacts adapted to be engaged by said armature, said armature being moved one way by movement of one of the points on the pipe segment in one direction and being moved the opposite way by movement of the other of the points on the segment in the same direction, whereby the armature is substantially stationary when both points on the pipe segment move in the same direction by the same amount and whereby said armature moves when the points on the pipe segment move in different directions and also when they move in the same direction by different amounts, a force exerting unit acting on the pipe segment and electrically connected to said switch and being actuated by engagement of said armature with one of said contacts to thereby exert a force on the pipe segment to maintain it in any desired orientation with respect to the equipment.

7. A device for maintaining a pipe segment at any desired orientation with respect to a piece of fluid handling equipment in a fluid system, said device including a differential electric switch having an armature pivoted on an axis and provided with a bevelled pinion, a pair of bevelled gears rotatable about said axis and meshed with said pinion at opposite points thereon, one of said gears being connected to a first point on the pipe segment and being rotated one way a certain amount by movement of the first point in one direction, the other of said gears being connected to a second point on the pipe segment and being rotated the other way an equal amount by an equal movement of the second point on the pipe segment in the same direction, whereby said armature remains substantially stationary when both the first and second points on the pipe segment move in the same direction by the same amount, and whereby said armature rotates about said axis when the first and second points on the pipe segment move in different directions and also when the points on the pipe segment move unequally in the same direction, a contact engaged by said armature to close said switch when said armature rotates a predetermined amount, a force exerting unit acting upon the pipe segment, said force exerting unit being electrically connected to said switch and being actuated by engagement of said armature with said contact to exert force on the pipe segment to maintain it in any desired orientation with respect to the equipment.

8. A force exerting mechanism comprising a first member having a connection point thereon, a second member having a connection point thereon, means for moving said members with respect to each other to change the distance between said connection points and thereby change the length of said mechanism, a third member having at least two parts movable independently of said change in length to actuate said moving means to change said length.

9. A force exerting mechanism for exerting force on a segment of fluid handling equipment to control the position occupied by said segment, said mechanism comprising a first member having a connection point thereon adapted to be connected to said system, a second member having a connection point thereon, means for moving said members with respect to each other to change the distance between said connection points and thereby control the length of said mechanism, a differential switch for actuating said moving means, said switch having a pair of control members adapted to be operably connected to spaced apart points on said equipment, said switch being responsive to predetermined differential movement of said control members.

10. Apparatus for controlling the position of at least a portion of fluid handling equipment subject to a change in position due to a change in a thermal condition of said equipment, said apparatus comprising means adapted to be operably connected to said portion and responsive to said change in thermal condition for applying to said portion external force to control movement of said portion to a desired position irrespective of the position change said portion would have had due to said thermal condition change without the application of said external force, energy valve means operably connected to said force applying means and adapted to be operably connected to a source of energy to control operation of said force applying means, and means operably connected to said energy valve means and responsive to said change in thermal condition to control said energy valve means, said energy valve control means comprising means for sensing a deviation in position of said portion from said desired position at said changed thermal condition and for controlling said energy valve means in response thereto to control the operation of said force applying means to force said portion to assume said desired position at said changed thermal condition, said energy valve control means thereby correlating said desired position of said portion with said changed thermal condition.

11. Apparatus for controlling the orientation of at least a portion of fluid handling equipment subject to a change in orientation caused by a change in a thermal condition of said equipment, said apparatus comprising means adapted to be operably connected to said portion for applying to said portion external force to control movement of said portion to a desired orientation irrespective of the orientation change said portion would have had due to said thermal condition change without the application of said external force, energy valve means operably connected to said force applying means and adapted to be operably connected to a source of energy to control operation of said force applying means, means operably connected to said energy valve means and to said portion for sensing a deviation in orientation of said portion from said desired orientation at said thermal condition change and for controlling said energy valve means in response thereto to control the operation of said force applying means to force said portion to assume said desired orientation at said changed thermal condition.

12. An apparatus according to claim 11, said sensing means being connected to spaced apart points on said portion to thereby sense said deviations in orientation of said portion from said desired orientation.

13. An apparatus according to claim 12, said desired orientation being different than the orientation of said portion prior to said change in thermal condition.

14. An apparatus according to claim 12, said force applying means being responsive to said sensing means to maintain said orientation substantially the same as it was prior to said change in thermal condition.

15. Apparatus according to claim 11 in which said fluid handling equipment comprises fluid source and fluid receiver units and a piping system extending between and having its opposite ends secured to connections on said units and in which said portion comprises a pipe segment adjacent to at least one of said connections.

16. An apparatus according to claim 11, in which said force applying means comprises a motor driven jack.

17. Apparatus for controlling the orientation of at least a portion of fluid handling equipment subject to a change in orientation due to a change in a thermal condition of said equipment, said apparatus comprising force applying means adapted to be operably connected to said portion and movable to restrict said portion against movement due to said change in thermal condition to any orientation substantially different from a desired orientation, energy valve means operably connected to said restricting means and adapted to be operably connected to a source of energy to control movement of said restricting means and means operably connected to said energy valve means and to said portion for sensing a deviation in orientation of said portion from said desired orientation at said changed thermal condition and for controlling said energy valve means in response thereto to control the operation of said restricting means to force said portion to assume said desired orientation at said changed thermal condition.

18. A method for controlling the orientation of at least a portion of a piping system which is subject to a change in orientation due to a change in temperature, said method comprising applying to said system external force to force said portion of said system to assume a desired orientation at said changed temperature different from the orientation it would assume without said force when substantially weight supported at said changed temperature, said force being applied by controlling energy valve means between a source of energy and force applying means in response to a deviation of said orientation of said pipe from said desired orientation due to said changed temperature to force said portion to assume said desired orientation at said changed temperature.

References Cited in the file of this patent

UNITED STATES PATENTS

| | | |
|---|---|---|
| 2,248,730 | Wood | July 8, 1941 |
| 2,636,351 | Brooks | Apr. 28, 1953 |
| 2,787,124 | Donahue | Apr. 2, 1957 |
| 2,929,397 | Sloan et al. | Mar. 22, 1960 |